United States Patent [19]
Kraft et al.

[11] Patent Number: 6,137,628
[45] Date of Patent: Oct. 24, 2000

[54] STEREOMICROSCOPE HAVING A SPECIMEN CHANGER

[75] Inventors: Winfried Kraft, Asslar-Werdorf; Klaus-Dieter Schwab, Heidenheim, both of Germany

[73] Assignee: Carl Zeiss Jena GmbH, Jena, Germany

[21] Appl. No.: 09/128,996

[22] Filed: Aug. 4, 1998

[30] Foreign Application Priority Data

Aug. 6, 1997 [DE] Germany ............................ 197 33 990

[51] Int. Cl.⁷ .................................................. G02B 21/26
[52] U.S. Cl. ...................... 359/394; 359/388; 414/223.01
[58] Field of Search ................................... 359/368, 376, 359/391, 394, 398, 390, 388; 414/223.01

[56] References Cited

U.S. PATENT DOCUMENTS

| | | | |
|---|---|---|---|
| 407,192 | 7/1889 | Frost | 359/394 |
| 3,762,798 | 10/1973 | Grubb et al. | |
| 4,284,327 | 8/1981 | Kraft et al. | 359/388 |
| 4,582,191 | 4/1986 | Weigand | 198/339.1 |
| 4,690,522 | 9/1987 | Welsh | 359/390 |
| 4,722,598 | 2/1988 | Ford | |
| 4,765,342 | 8/1988 | Kelln et al. | |
| 5,367,401 | 11/1994 | Saulietis | 359/398 |

FOREIGN PATENT DOCUMENTS

| | | |
|---|---|---|
| 369790 | 1/1907 | France . |
| 1598637 | 1/1972 | Germany . |
| 2139153 | 10/1972 | Germany . |
| 5-297282 | 11/1993 | Japan . |

*Primary Examiner*—Thong Nguyen
*Assistant Examiner*—Mark A. Robinson
*Attorney, Agent, or Firm*—Walter Ottesen

[57] ABSTRACT

The invention is directed to a stereomicroscope having a specimen changer which is at least so configured that it is rotatable about a column of a column stand and the specimen changer has receptacles for specimens arranged on a circular path passing through the viewing beam path. The specimen changer includes an inner stationary part and an annular-shaped outer part which includes the receptacles for the specimens. The specimen receptacles have a diameter suitable for receiving commercially available petri dishes.

12 Claims, 4 Drawing Sheets

STEREOMICROSCOPE HAVING A SPECIMEN CHANGER

BACKGROUND OF THE INVENTION

Stereomicroscopes are used with increased interest for various microscopic applications such as in the area of botany, zoology, mineralogy, and microelectronics because the objects appear unreversed and can be viewed spatially in the microscope and the reference to the object remains for small magnifications and larger object fields.

A suitable specimen changer is required for the investigation of many different specimens.

For microscopes, specimen changers are known in carousel form or as a revolving stage, for example, as shown in German patent publication 3,620,877 and international patent publication WO 93/06516.

German patent publication 1,598,637 discloses a specimen changer device for a ray-optic apparatus.

SUMMARY OF THE INVENTION

It is an object of the invention to provide a stereomicroscope wherein many different specimens are accessible for rapid viewing.

The stereomicroscope of the invention includes: a column stand having a base and a column extending upwardly therefrom; viewing optical assembly mounted on the column and defining a viewing beam path; a specimen changer having a plurality of locations for accommodating respective specimens; and, the specimen changer having at least one part mounted to rotate about the column so as to cause the locations to move along a circular path intersecting the viewing beam path thereby permitting each of the specimens to be viewed through the viewing optical assembly.

The invention affords special advantages in the presentation at exhibitions, conventions or museums because different customers with different interests can be shown an object of their area of interest in a simple manner. Especially in schools, all kinds of specimens from insects to material samples can be viewed. In this context, it is especially advantageous that the specimen changer of the invention can be loaded with commercially available petri dishes. The specimens are protected from damage and removal by a common cover. Viewing can take place under conditions which are reproducible with respect to alignment to the stand as well as with respect to illuminating conditions.

A rapid motorized and programmable exchange between different specimens is possible especially when the adjusted focus range of the objective can be maintained for relatively flat specimens. An automatic readjustment of the focusing can likewise be provided. In addition, an exchange between different specimen holders can be made by exchanging the external ring without intervening in the optical and mechanical fixing of the microscope.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
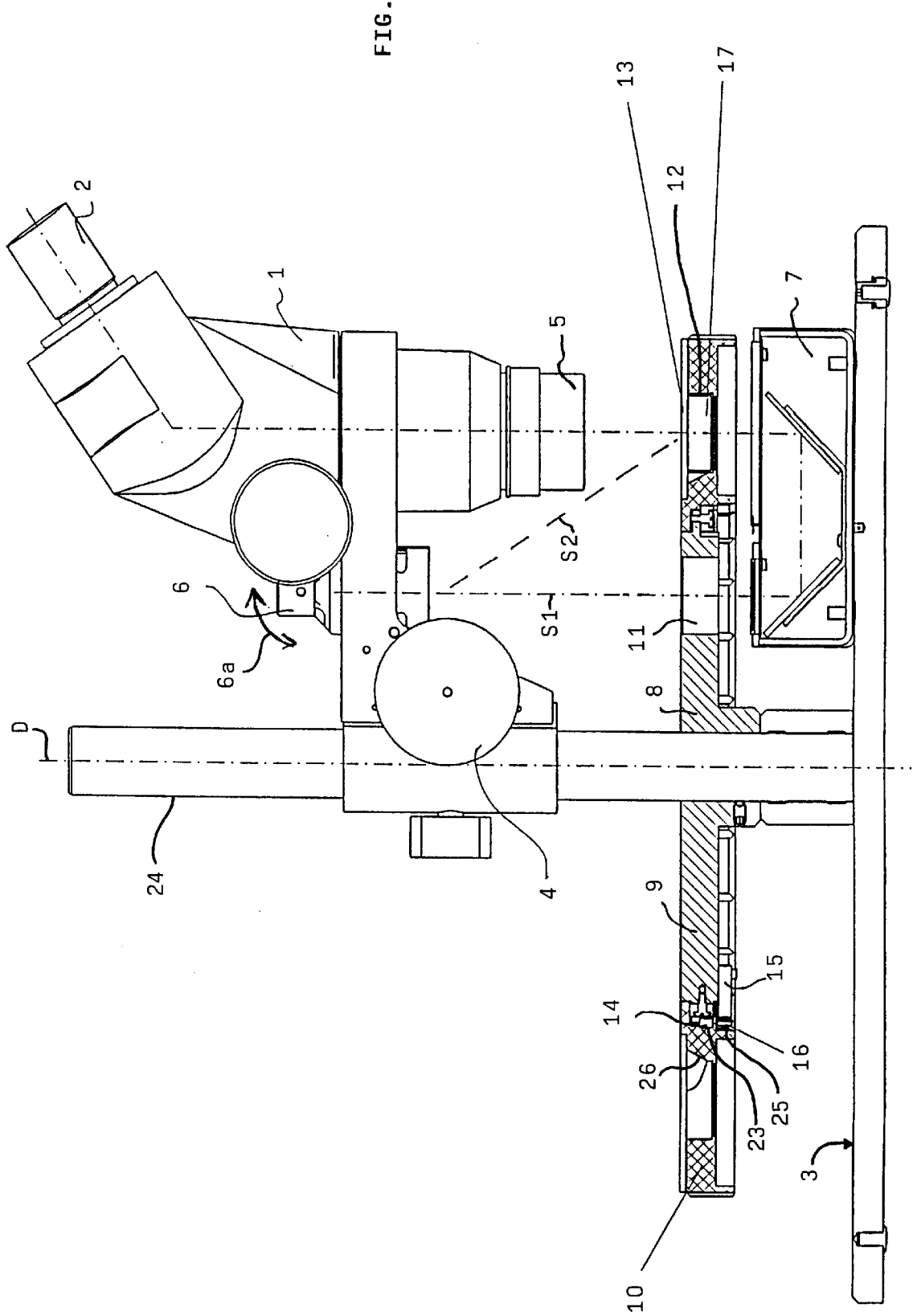
FIG. 1 is a side elevation view of a stereomicroscope equipped with a specimen changer according to a feature of the invention.

The stereomicroscope 1 shown in FIG. 1 includes an ocular 2 and is attached to a column stand 3. The microscope 1 is vertically adjustable by means of a focusing knob 4. The microscope 1 includes an exchangeable objective 5.

A pivotable light source 6 can be pivoted as indicated by double arrow 6a and serves to illuminate the object. In the position S1 shown, the light source 6 serves to subsurface illuminate the object via a mirror assembly 7. On the other hand, in the pivot position S2, the light source 6 serves to incident illuminate the object.

The probe changer 8 is attached to the column 24 of the column stand 3. The specimen changer 8 includes a stationary inner part 9 and an outer part 10 rotatable about a rotational axis D as indicated by double arrow 10a. The inner part 9 includes a breakthrough 11 between the light source 6 and the mirror assembly 7 for subsurface illumination. Recesses 12 are provided in the outer part 10 for receiving commercially available petri dishes 17 in which the most different specimens can be placed. An annular-shaped transparent specimen cover 13 is provided above the recesses.

The recesses 12 are beveled at 26 on the side thereof facing toward the rotational axis D in order to ensure an unimpeded incident illumination in the position S2 of the light source 6. The outer part 10 is movably journalled on the inner part 9 via roller bearings 14 mounted on the inner part 9. The roller bearings 14 run on a first cylindrical surface 23 formed on the outer part 10.

A latch spring 15 is mounted on a bracket 15a and has a detent ball 16 at its outer end and ensures that the rotation of the outer part 10 takes place in defined detent steps whereby a defined position of the particular specimen in the beam path of the stereomicroscope is made possible. The detent steps are defined by respective recesses 16a into which the detent ball 16 latches. The recesses 16a are formed in a second cylindrical surface 25 of the outer part 10. The bracket 15a is mounted on the inner part 9.

Figure 2:
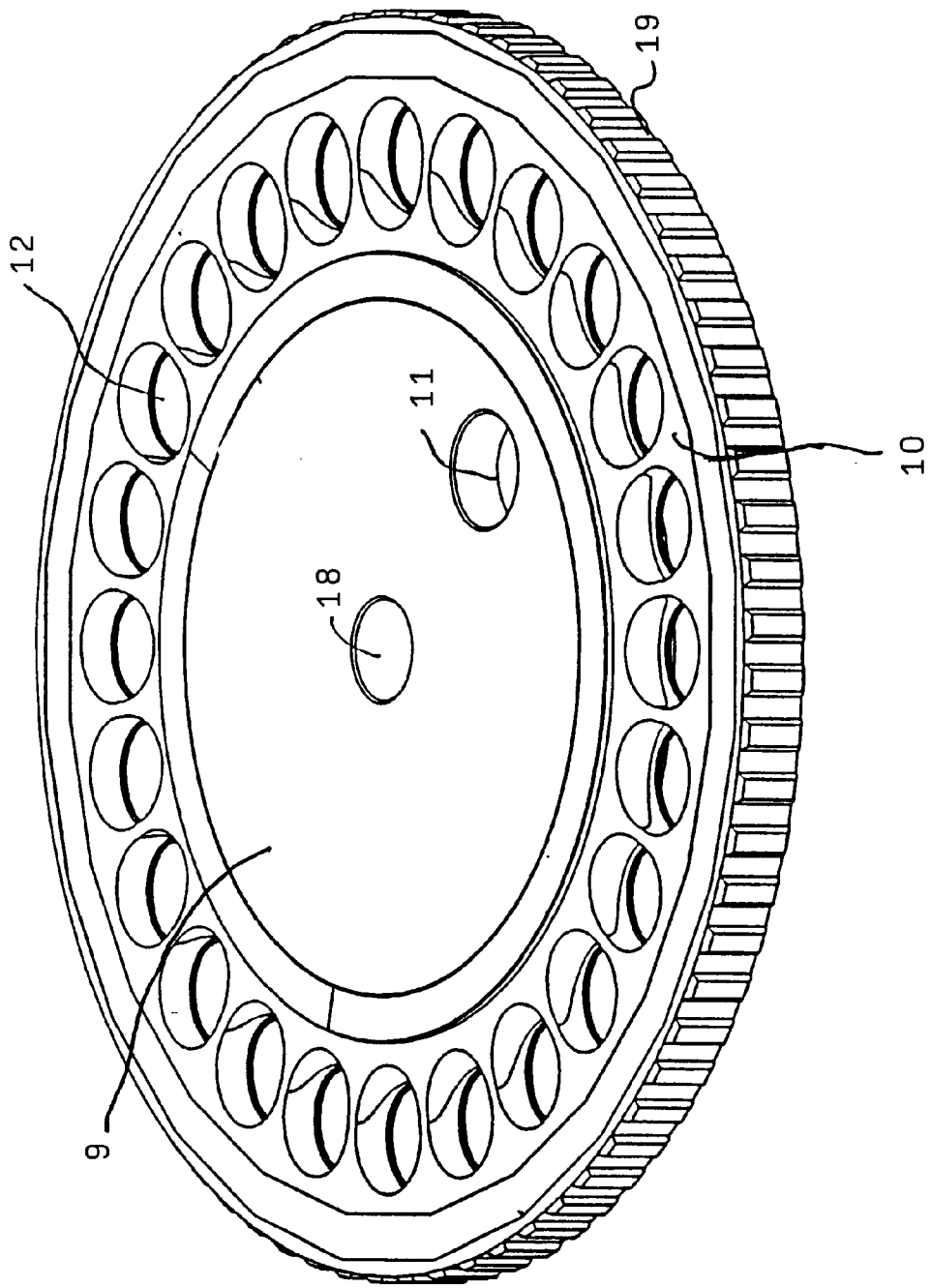
FIG. 2 is a perspective view of the specimen changer.

FIG. 2 shows a perspective view of the specimen changer having the recesses 12, the opening 11 for the illumination and opening 18 for the column 24 of the column stand 3 as well as a knurled peripheral edge 19 to facilitate manipulation by a viewer.

Figure 3:
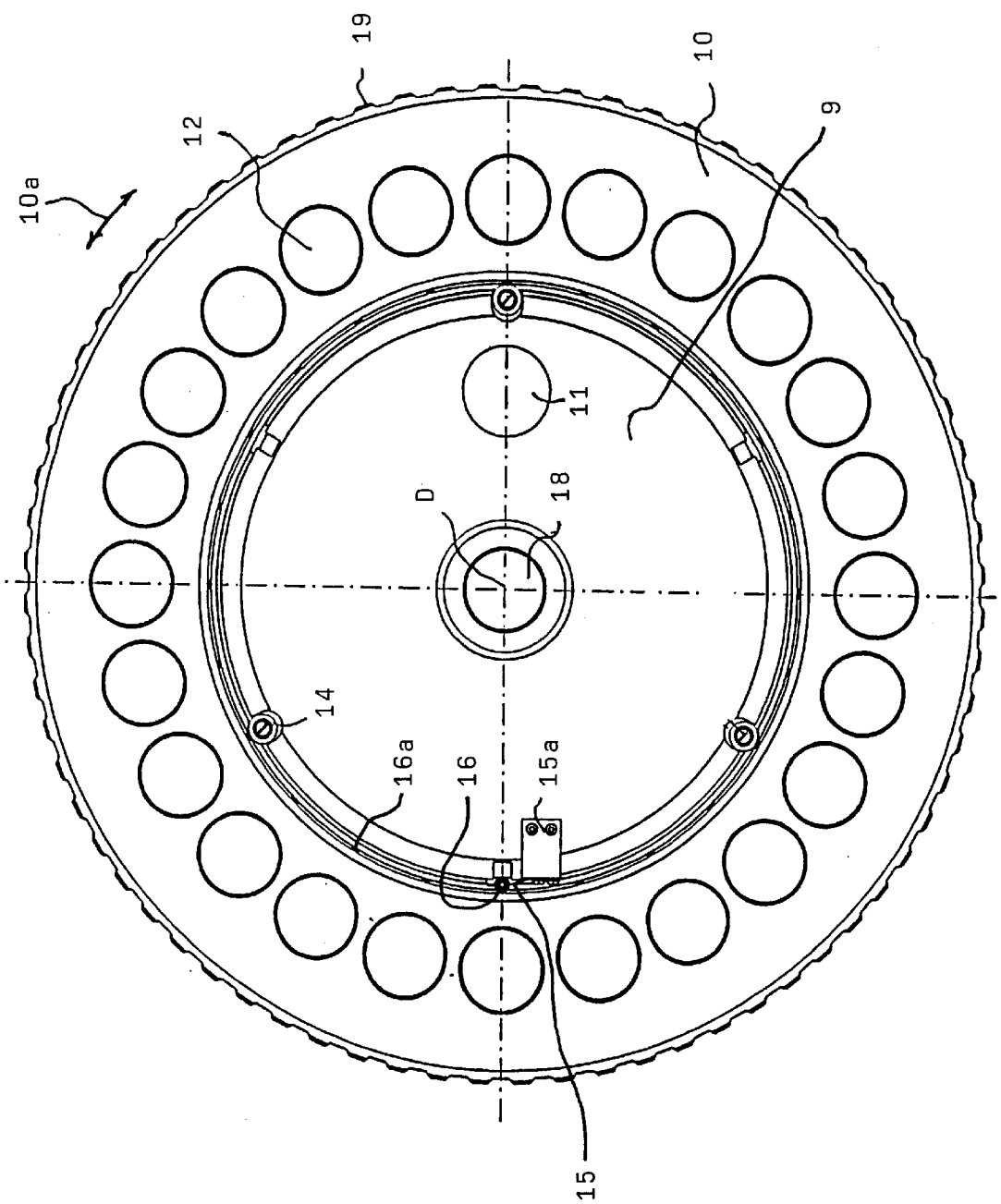
FIG. 3 is a bottom plan view of the specimen changer.

In FIG. 3, the latch spring 15 as well as a running roller bearing 14 are shown in detail.

Figure 4:
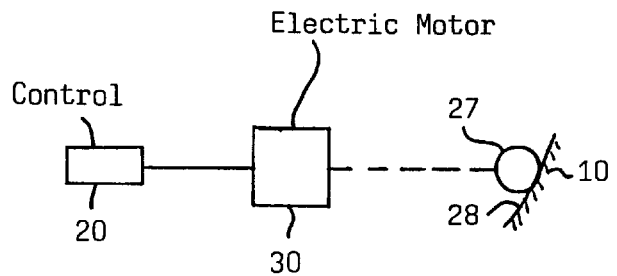
FIG. 4 is a detail schematic showing how the outer part of the specimen changer can be driven by a motor; and, FIG. 5 is a breakout detail view, in section, of a portion of the specimen changer.

Advantageously, and as shown in FIG. 4, one of the roller bearings 14 can be a drive wheel such as a toothed wheel or pinion 27 which engages in an internal gear 28 on the outer part 10 whereby this internal gear can be driven by an electric motor 30 via the pinion 27. A control 20 can be mounted on the inner part 9 for controlling the motor 30.

Figure 5:
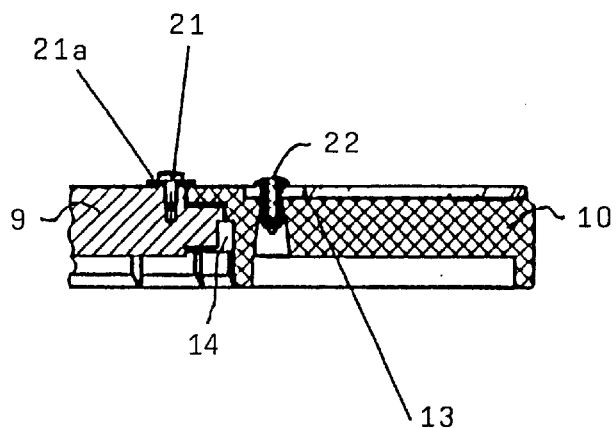

FIG. 5 shows a detail view, in section, through a portion of the specimen changer. Here, it can be seen that the outer part 10 can be exchangeably mounted on the inner part with screws 21. A holder 21a holds the outer part 10 so that it can rotate relative to the inner part 9 but will not move upwardly relative to the latter. The holder 21a is held in place by a screw 21. Removable index pins 22 can be provided for the transparent cover 13 which can, for example, be made of glass or plexiglass. In this way, a covering is provided to secure the specimens and, on the other hand, to ensure a rapid exchange of the specimens.

It is understood that the foregoing description is that of the preferred embodiments of the invention and that various changes and modifications may be made thereto without departing from the spirit and scope of the invention as defined in the appended claims.

What is claimed is:

1. A stereomicroscope comprising:

a column stand having a base and a column extending upwardly therefrom;

viewing optical assembly mounted on said column and defining a viewing beam path;

a specimen changer having a plurality of locations for accommodating respective specimens;

said specimen changer having at least one part mounted to rotate about said column so as to cause said locations to move along a circular path intersecting said viewing beam path thereby permitting each of said specimens to be viewed through said viewing optical assembly;

said specimen changer including: a stationary inner part fixedly mounted on said column; and, an annularly-shaped outer part defining said one part and being movably mounted on said inner part;

said annularly-shaped outer part defining said locations for accommodating said specimens;

said annularly-shaped outer part being removably attached to said inner part;

said stationary inner part and said annularly-shaped outer part conjointly defining an interface; and, mounting means at said interface to facilitate the removal and exchange of said annularly-shaped outer part with another like annularly-shaped outer part.

2. The stereomicroscope of claim 1, said locations being respective recesses each having a diameter suitable for accommodating a commercially available petri dish.

3. The stereomicroscope of claim 2, further comprising a transparent cover removably mounted on said outer part and common to all of said locations.

4. The stereomicroscope of claim 3, said cover being made of a transparent material selected from the group consisting of glass and plexiglass.

5. The stereomicroscope of claim 3, said transparent cover being an annular-shaped cover.

6. The stereomicroscope of claim 5, further comprising means for removably holding said transparent cover in place.

7. The stereomicroscope of claim 1, further comprising a light source mounted on said stand; and, said inner part having an opening formed therein for passing said light through said inner part thereby facilitating subsurface illumination of s aid specimens.

8. The stereomicroscope of claim 1, said outer part having an outer peripheral surface knurled to facilitate manipulation by an operator.

9. The stereomicroscope of claim 1, further comprising gear means interposed between said inner part and said outer part; and, motor means operatively connected to said gear means to drive said outer part relative to said inner part.

10. A stereomicroscope comprising:

a column stand having a base and a column extending upwardly therefrom;

viewing optical assembly mounted on said column and defining a viewing beam path;

a specimen changer having a plurality of locations for accommodating respective specimens;

said specimen changer having at least one part mounted to rotate about said column so as to cause said locations to move along a circular path intersecting said viewing beam path thereby permitting each of said specimens to be viewed through said viewing optical assembly;

said specimen changer including: a stationary inner part fixedly mounted on said column; and, an annularly-shaped outer part defining said one part and being movably mounted on said inner part;

a light source mounted on said stand;

said inner part having an opening formed therein for passing said light through said inner part thereby facilitating subsurface illumination of said specimens; and, said light source being pivotally mounted on said stand so as to be selectively movable between a first position to facilitate said subsurface illumination and a second position to facilitate incident illumination of said specimens.

11. The stereomicroscope of claim 10, said light source generating a light beam defining a light path and said light path intersecting said circular path when said light source is in said second position.

12. The stereomicroscope of claim 10, wherein said stationary inner part and said annularly-shaped outer part conjointly define an interface; and, wherein said stereomicroscope further comprises mounting means at said interface to facilitate the removal and exchange of said annularly-shaped outer part with another like annularly-shaped outer part.

* * * * *